(12) United States Patent
Megiddo

(10) Patent No.: US 7,480,621 B1
(45) Date of Patent: Jan. 20, 2009

(54) SYSTEM, METHOD AND PROGRAM PRODUCT FOR AUTOMATICALLY MANAGING CONTRACTS

(75) Inventor: Nimrod Megiddo, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 599 days.

(21) Appl. No.: 09/533,325

(22) Filed: Mar. 22, 2000

(51) Int. Cl.
*G06Q 10/00* (2006.01)
*G06F 17/50* (2006.01)

(52) U.S. Cl. ............................................. 705/1; 705/7
(58) Field of Classification Search ..................... 705/1, 705/7
See application file for complete search history.

(56) References Cited

U.S. PATENT DOCUMENTS

| | | | | |
|---|---|---|---|---|
| 5,570,291 | A * | 10/1996 | Dudle et al. | 101/483 |
| 5,689,650 | A | 11/1997 | McClelland et al. | |
| 5,875,431 | A | 2/1999 | Heckman et al. | |
| 5,893,906 | A * | 4/1999 | Daffin et al. | 705/28 |
| 5,913,164 | A | 6/1999 | Pawa et al. | |
| 5,991,733 | A | 11/1999 | Aleia et al. | |
| 6,122,633 | A * | 9/2000 | Leymann et al. | 705/4 |
| 6,144,943 | A * | 11/2000 | Minder | 235/375 |
| 6,308,188 | B1 * | 10/2001 | Bernardo et al. | 707/501.1 |
| 6,381,610 | B1 * | 4/2002 | Gundewar et al. | 705/10 |
| 6,578,006 | B1 * | 6/2003 | Saito et al. | 705/9 |
| 6,684,196 | B1 * | 1/2004 | Mini et al. | 705/26 |

FOREIGN PATENT DOCUMENTS

FR 2 586 316 A1 * 2/1987
FR 2586316 A1 * 2/1987

OTHER PUBLICATIONS

Addendum of Clauses, Greater Capital Area Of Realtors®, Inc. GCAAR From No. MC & DC 1332A/B.*
Blanche Evans, "Electronic Transactions Are The Future, Says NAR President", Mar. 8, 1999, RealtyTimes.com.*

(Continued)

*Primary Examiner*—Naresh Vig
(74) *Attorney, Agent, or Firm*—Rabin & Champagne PC; Marc D. McSwain; Brian K. Lambert

(57) ABSTRACT

A system, method and program product for commerce management, especially for managing contingency agreements or contracts. An agreement is entered into the system, logging conditions for the agreement and identifying potential responses to satisfy each condition. A location may also be identified for each identified potential response, e.g. a HTML link to an internet web site. Milestones are set to determine when to check whether conditions have been satisfied. As each milestone is encountered information is retrieved from the locations or provided manually. The retrieved information is checked to determine whether the agreement is determinate, i.e., all of the conditions have been satisfied or, the agreement has failed because one condition will not be satisfied. If more conditions remain unsatisfied and are identified with subsequent milestones, the most recent milestone is recorded. The contracting parties are notified regarding status of the agreement and of passing any milestone. Notification and reminders may be by electronic mail (e-mail) or by more traditional mail.

6 Claims, 2 Drawing Sheets

OTHER PUBLICATIONS

Blanche Evans, "Whee Will The Real Estate Be in Five Years?", Mar. 15, 1999, RealtyTimes.com.*
Information on Dawsons, Nov. 14, 1999, NMHomes.com.*
Information on New York Times, 1999.*
Information on Pointcast Incorporated, 1999, Archived web page printed through www.archive.org; Date is in the URL in YYYYMMDD format.*
Khameleon Enterprise Business Application Software Product Line, Feb. 22, 2000, Business Wire.*
Gartner Institute Offers IT Project Management ERP Specialization, Feb. 7, 2000, Business Wire.*
Tischelle George, PeopleSoft Enters market for Professional-Services Automation, Mar. 6, 2000, Information Week, Iss 776, p. 4.*

* cited by examiner

SYSTEM, METHOD AND PROGRAM PRODUCT FOR AUTOMATICALLY MANAGING CONTRACTS

BACKGROUND OF THE INVENTION

1. Field of the Invention

The present invention generally relates to methods of contract management and, more particularly to managing contingency contracts or agreements in electronic commerce.

2. Background Description

Agreements often include one or more conditions that affect the duties and obligations in a bargain of the contracting parties. These conditions may be based upon events that may or may not occur or, upon required actions by any or all of the contracting parties. Conditions which require the occurrence of an event to satisfy the condition are known as conditions precedent. Conditions which require the event not to occur are referred to as conditions subsequent. Agreements or contracts containing such conditions, which also may be referred to as contingencies, may be referred to as contingency contracts.

For example, in a real estate sales agreement a home buyer may be committed to purchase a house, provided the house passes inspection, i.e., as a condition precedent. If the house does not pass the inspection there may be no obligation on the part of either party. In yet another condition of the same real estate sales agreement, the home buyer may commit to buy the house, unless the buyer cannot arrange financing under predetermined terms, i.e., a condition subsequent. The buyer's subsequent failure to obtain financing would discharge the buyer's obligation to purchase the house. Prior to the occurrence of these contingent events, it cannot be determined with absolute certainty whether the sale will ever occur.

Thus, until it can be determined whether or not a contingent event occurs, the contract is indeterminate with respect to that event. By contrast, once the contingent event occurs, the contract is determinate with respect to that event. Further, typically, occurrence of these contingent events are time limited to make the contract determinate after a period of time.

Typically, depending upon the particular contingency, one contracting party must notify others upon satisfaction of the conditions or the failure thereof. Also, very often these contingencies depend upon the actions of third parties, e.g., a lender, a housing inspector. Miscommunication between the parties can kill or delay the sale and, in some instance result in lawsuits, e.g., where the seller, believing the buyer could not get financing, agrees to sell the property to a second buyer.

Thus, parties to commercial transactions need ways to include contingencies based on events that are recognized, automatically, by a commerce management system managing commercial transactions.

SUMMARY OF THE INVENTION

It is therefore a purpose of the present invention to improve contract management;

It is another purpose of the present invention to automatically manage contract contingencies;

It is yet another purpose of the present invention to reduce miscommunication between parties to an indeterminate contingency agreement.

The present invention is a system, method and program product for commerce management, especially for managing contingency agreements or contracts. An agreement is entered into the system, logging conditions for the agreement and identifying potential responses to satisfy each condition. A location may be identified for each identified potential response, e.g. a HTML link to an internet web site. Milestones are set to determine when to check whether conditions have been satisfied. As each milestone is encountered information is retrieved from the locations or provided manually. The retrieved information is checked to determine whether the agreement is determinate, i.e., all of the conditions have been satisfied or, the agreement has failed because one condition will not be satisfied. If more conditions remain unsatisfied and are identified with subsequent milestones, the most recent milestone is recorded. The contracting parties are notified regarding milestones passed and status of the agreement and reminders may be sent. Notification and reminders may be sent by electronic mail (e-mail) or by more traditional mail.

BRIEF DESCRIPTION OF THE DRAWINGS

The foregoing and other objects, aspects and advantages will be better understood from the following detailed preferred embodiment description with reference to the drawings, in which.

DETAILED DESCRIPTION OF A PREFERRED EMBODIMENT OF THE INVENTION

Figure 1:
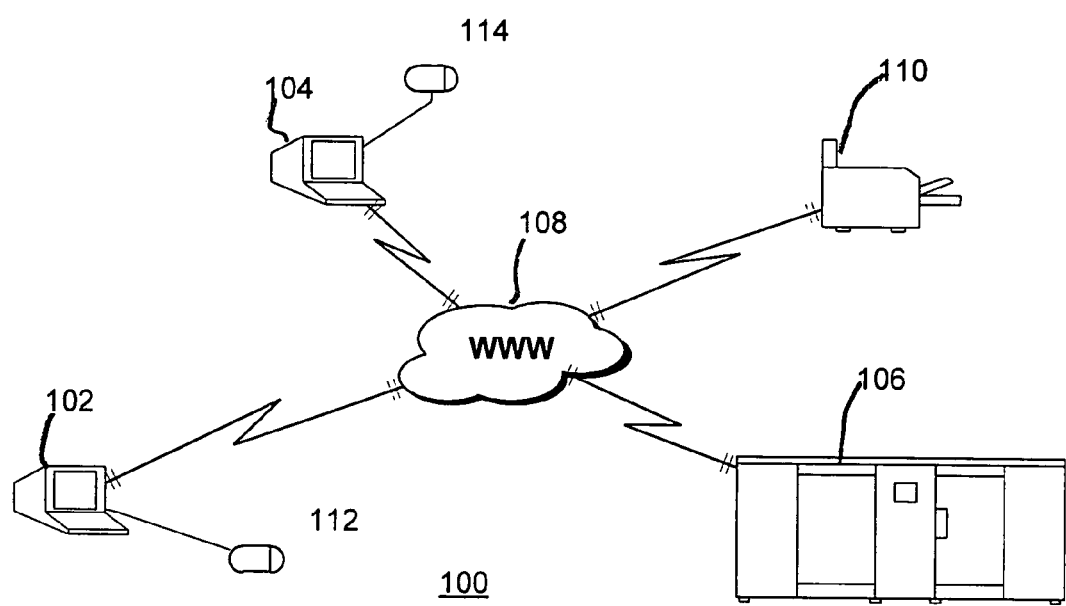
FIG. 1 is an example of the preferred embodiment contract management system of the present invention.

Referring now to the drawings, and more particularly, FIG. 1 is an example of a commerce management system 100 for managing commercial transactions according to the preferred embodiment of the present invention. The preferred system 100 includes multiple input terminals 102 and 104 remotely connected to one or more servers 106. The terminals 102, 104 and server may be connected together, for example, over what is known as the Internet or the World Wide Web (www) 108. The server 106 maintains contract contingency related information that may include typically used information, e.g., the "consumer's price index" (CPI) or the "prime lending rate" (Prime), as well as agreement specific contingency information. Agreement specific information may be provided by the contracting parties or, preferably, provided independently by an originating third party, e.g., the buyer's lender or a building inspector. One or more printer 110 may be remotely connected or connected directly to one or more of the terminals 102, 104 and, optionally, to the server 106.

When an agreement is reached, the contract may be registered at one of the terminals 102, 104 and any conditions in the contract may be identified and logged in a database in the server 106. In particular, the preferred commerce management system 100 maintains one or more lists of all contingency milestones or deadlines for every registered agreement. Collected information is stored in a suitable data structure form, e.g., a heap, to facilitate, as each milestone is reached, fast selection of a next milestone.

At each milestone the system 100 fetches contingency data corresponding to that milestone and updates corresponding contract information accordingly. Thus, at any particular milestone the system 100 may indicate that an agreement may have become determinate, i.e., either the agreement has failed for failure to satisfy a condition precedent or failed because of the occurrence of an event satisfying a condition subsequent; or, a condition precedent has been satisfied. (Passage of a milestone without satisfaction of a condition subsequent is treated as satisfaction of a condition precedent.)

Optionally, the system may also include milestones to trigger initiating tasks that facilitate the contractual process such as ordering inspections and tests. For these optional milestones the system 100 sends reminders, preferably using electronic mail (e-mail) at an appropriate time or, a reminder is printed on printer 110 and mailed using an appropriate carrier such as the U.S. Postal Service. Further, the system 100 notifies the parties to a contract after the occurrence or lack thereof of each conditional event using an appropriate carrier or e-mail. Thus, the system 100 may inform the parties automatically of conditions being met to remove contingencies, of fixing contractual variables (e.g, mortgage rate) or of failure of the contract due to the lack of the occurrence of a condition precedent. Also, the system 100 may remind parties automatically of individual contractual obligations, e.g., apply for a loan, sell stock, etc.

Figure 2:
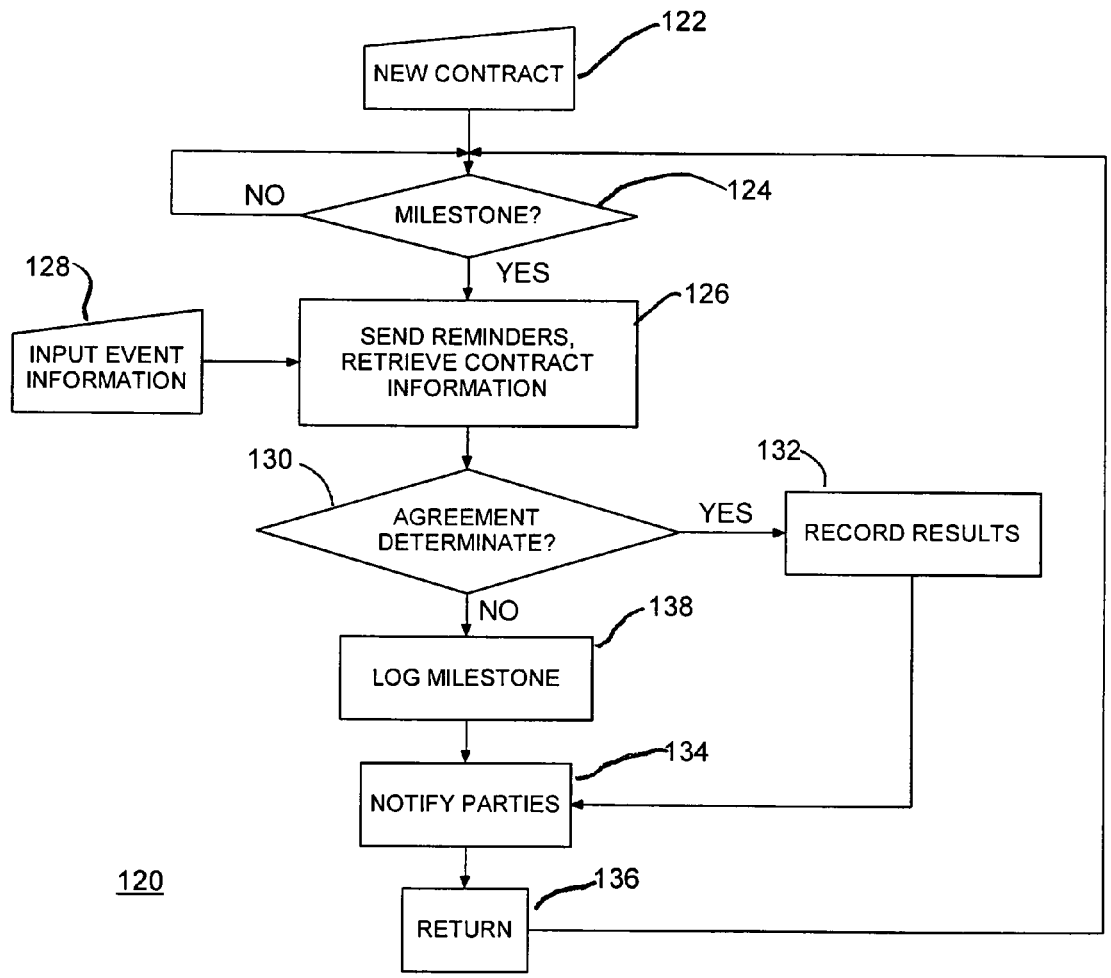
FIG. 2 is a flow diagram of the preferred contract contingency management method of the present invention.

FIG. 2 is a flow diagram of the preferred automatic contingency contract management method 120 of the present invention. As noted hereinabove, contractual conditions are entered in the system 100 and the contracting parties may go their separate ways. Typically, each party takes whatever steps are required to see that contractual conditions (precedent) are satisfied. When an agreement is entered into the system 100, in addition to entering information to identify the contracting parties, in step 122 the conditions are identified with a contingency and a milestone deadline is associated with each condition. Alarms are set in the system 100 for each milestone. Also, for conditions contingent upon independent informational sources such as the CPI or Prime, those informational sources are identified and links are provided to the sources. Having entered conditional information, the system enters a wait state in step 124 and no further action is taken until a milestone deadline occurs. It should be noted that milestones may be checked periodically prior to the deadline and, checking a milestone may be initiated manually at any time prior to the deadline.

When a milestone deadline occurs in step 126, a system timer sends a flag to initiate checking contract contingencies. Also, where appropriate, reminders may be sent and any information related to the particular deadline is retrieved. Such deadline related information may be retrieved by the system automatically, from previously identified links, as well as being provided manually in step 128 by individuals, e.g., a building inspector's report. In step 130, the retrieved information is checked to determine if the contract is determinate, i.e., all conditions have been met or one condition has failed. If the contract is determinate, then in step 132, the results are recorded. After recording results the contracting parties are notified in step 134 and in step 136 the system 100 is returned to a wait state until the next milestone deadline. If the contract is not yet determinate in step 130, some conditions still require additional action and, in step 138 passage of the particular deadline is recorded. The next milestone deadline is scheduled in step 140. Parties are notified of the passage of each milestone in step 134 and in step 136 the system 100 is returned to a wait state until the next milestone.

Thus, the commerce management system 100 of the preferred embodiment of the present invention allows contracting parties to select contingencies in their agreement having some contingent terms depend on events and data that may be observed to manage the contracts automatically.

MILESTONE EXAMPLES

As indicated above, conditions may depend upon independent informational sources. For example, links may be provided to informational sources including, but not limited to:

Conditioned upon the Buyer Obtaining a Loan: In particular, home sales contracts include contingency clauses making the sales agreement conditioned upon the buyer obtaining a home loan. Home mortgage loans are available over the www from web based lenders. In this example the home seller and buyer parties can agree that the buyer will apply for a loan from web based lender. The system 100 would be given permission to check the loan application status, automatically, and remove the contingency, automatically, when the condition is met, i.e., when the loan is approved or, indicating failure of the contract when the home loan is denied.

Exchange Rates: Parties to an international transaction may agree that the purchase price of products will be fixed on the day of delivery of the goods rather than at the time of signing the contract and, further that the purchase price depends on a certain exchange rate. These specific dependencies can be specified in the agreement. For example, such a contract may recite "buyer agrees to pay in Swiss Francs an amount equal to $1000 at the dollars to Swiss Francs exchange rate as published in http://www.cnnfn.com/markets/currencies/ at 12 noon on April 16 or the day of the delivery, whichever is earlier."

Interest Rates: A seller may be willing to lend money to a buyer to facilitate a transaction. The loan financing terms may be set, automatically, by retrieving information readily available on the world-wide-web. For example, such a sales agreement may recite: "Seller agrees to loan buyer $10,000 at a fixed interest rate equal to what is commonly referred to as the "prime lending rate" as posted at 12 noon on the day of this Agreement at http://www.cnnfn.com/markets/bondcenter/shorttemm.html." In another example, one party's obligation may be conditioned upon an external indicator reciting: "buyer agrees to purchase product provided the rate listed as the '3 month LIBOR' at http://www.cnnfn.com/markets/bondcenter/shortterm.html is at least 7% on 12 noon of Dec. 31, 2000."

Unit Price Based on Purchase Volume: Typically, suppliers offer volume discounts to customers. However, these volume discounts are based on the number of units of a particular order. The system of the present invention can allow sellers to commit to sell items at an automatically determined unit price based on total volume purchased by a specific deadline. An e-merchant (i.e., a merchant conducting business over the internet) can make sales volume history available, so that the volume may be aggregated and the discount provided, automatically.

Material or Commodities Costs: A manufacturer may agree to fill an order contingent upon raw material prices remaining below a particular value, i.e., a condition subsequent. Thus, where raw material prices are published regularly on the www, an appropriate condition may be included in the contract such as that provided above.

Yet other conditions may be included where appropriate. For example, purchasing tickets to outdoor events may be contingent, for example, on a favorable weather forecast for the event, published on a specified web site two days before the event. Some public auctions results are available on the www and contracts may be conditioned on such auction results. A contractual relationship may be conditioned upon election or ballot proposition results by providing an internet address pointing to a site containing expected results.

Additionally, contracting parties wishing to condition a contract on more private individual events may be facilitated by one or both parties posting information on a private internet site. For example, parties with access to the same Web site that is "for members only" can select contingencies based on events that may be directly related to one of the parties, themselves. So, the parties may condition the agreement upon winning some internal competition, being elected, etc. The foregoing milestone examples are included for example only and not intended as limitations.

While the invention has been described in terms of preferred embodiments, those skilled in the art will recognize that the invention can be practiced with modification within the spirit and scope of the appended claims.

What is claimed is:

1. An automated commerce management system comprising:
   a plurality of remotely connected terminals, wherein a first terminal of the plurality of remotely connected terminals is configured to receive an input for a first contingency agreement between a plurality of parties, wherein the first contingency agreement is from a plurality of contingency agreements;
   a server couplable to the plurality of remotely connected terminals and configured to manage the plurality of contingency agreements, comprising:
      a receiver configured to receive the input for the first contingency agreement from the first terminal;
      a module couplable to the receiver and configured to:
         identify from the input a contingency to be resolved;
         determine a milestone for when a contingent event of the contingency is to occur;
         determine an independent source configured to provide information with respect to the occurrence of the contingent event; and
         identify when the milestone is reached;
   an automatic data retriever couplable to the module and configured to retrieve information from the independent source when the milestone is reached,
   wherein the module is further configured to:
      determine from the retrieved information if the contingent event occurred;
      determine if the contingency is resolved if determined that the contingent event occurred;
      determine if the milestone is a deadline for when the contingency is to be resolved if determined that the contingent event did not occur; and
      identify the contingency agreement as determinate with respect to the contingent event if determined that the contingency is resolved or that the milestone is the deadline; and
   an automatic mailer couplable to the module and configured to notify the plurality of parties that the contingency agreement is determinate with respect to the contingent event if the module identifies the contingency agreement as determinate with respect to the contingent event.

2. The commerce management system as in claim 1, wherein:
   each contingency is one of the group consisting of:
      a condition precedent; and
      a condition subsequent; and
   notifying the plurality of parties comprises notifying the plurality of parties that the contingency agreement has failed when the contingent event:
      did not occur if the contingency is condition precedent; or
      occurred if the contingency is condition subsequent.

3. The commerce management system as in claim 1 wherein the retrieved information includes a mortgage rate.

4. The commerce management system as in claim 1, wherein information from the independent source includes at least one of: consumer's price index (CPI), prime lending rate (Prime), a currency exchange rate, a bond interest rate, a raw material price, auction results, election results, and ballot proposition results.

5. A computer program product for automatically managing a plurality of contingency agreements automated commerce management, said computer program product comprising a computer usable medium having computer executable program code thereon, said computer executable program code comprising:
   code for receiving a first contingency agreement of the plurality of contingency agreements, wherein the first contingency agreement is between a plurality of parties;
   code for identifying from the first contingency agreement a contingency to be resolved;
   code for determining a milestone for when a contingent event of the contingency is to occur;
   code for predetermining an independent source configured to provide information with respect to the occurrence of the contingent event;
   code for identifying when the milestone is reached;
   code for retrieving information related independent source when the milestone is reached;
   code for determining if the contingent event occurred from the retrieved information;
   code for determining if the contingency is resolved if determined that the contingent event occurred;
   code for determining if the milestone is a deadline for when the contingency is to be resolved if determined that the contingent event did not occur
   code for identifying the contingency agreement as determinate with respect to the contingent event if determined that the contingency is resolved or that the milestone is the deadline; and
   code for notifying the plurality of parties that the contingency agreement is determinate with respect to the contingent event if determined that the contingency is resolved or that the milestone is the deadline.

6. The computer program product as in claim 5, wherein information from the independent source includes at least one of: consumer's price index (CPI), prime lending rate (Prime), a currency exchange rate, a bond interest rate, a raw material price, auction results, election results, and ballot proposition results.

* * * * *